United States Patent
Quine (10) Patent No.: US 7,949,424 B2
(45) Date of Patent: May 24, 2011

(54) VIRTUAL CODE FOR DELIVERY TO THE NEAREST BUILDING OF ORGANIZATIONS HAVING MULTIPLE BUILDINGS

(75) Inventor: Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 871 days.

(21) Appl. No.: 11/851,421

(22) Filed: Sep. 7, 2007

(65) Prior Publication Data

US 2009/0069928 A1    Mar. 12, 2009

(51) Int. Cl.
G06F 7/00 (2006.01)
G06K 9/00 (2006.01)

(52) U.S. Cl. .......................... 700/224; 700/223; 209/584

(58) Field of Classification Search .................. 700/224, 700/223; 209/584, 583, 900
See application file for complete search history.

(56) References Cited

U.S. PATENT DOCUMENTS

| 4,831,555 | A | 5/1989 | Sansone et al. |
| 5,420,403 | A | 5/1995 | Allum et al. |
| 5,805,810 | A | 9/1998 | Maxwell |
| 7,136,504 | B2 * | 11/2006 | Hansel et al. ................. 382/101 |
| 7,390,986 | B2 * | 6/2008 | McDonald .................... 209/584 |

FOREIGN PATENT DOCUMENTS

JP    09-57199    3/1997

* cited by examiner

*Primary Examiner* — Gene Crawford
*Assistant Examiner* — Ramya Prakasam
(74) *Attorney, Agent, or Firm* — Brian A. Collins; Charles R. Malandra, Jr.

(57) ABSTRACT

A method that enables the post to deliver mail addressed to a recipient nearest location virtual address to be delivery directly to the recipient's nearest designated location or facility to the place the mail was posted. Mail addressed to the nearest location virtual address (mapping to a street address or post office box) would be captured by the post during the post's sortation process and routed to the nearest location or facility to the place the mail was posted. This enables the recipient to receive their mail more quickly since the amount of delivery time is reduced.

16 Claims, 8 Drawing Sheets

| ADDRESS | REGION | RANK |
|---|---|---|
| PITNEY BOWES WHQ<br>1 ELMCROFT RD.<br>STAMFORD CT 06926-0700 | STAMFORD-SHELTON | 1 |
| PITNEY BOWES<br>35 WATERVIEW DR.<br>SHELTON CT 06484 | STAMFORD-SHELTON | 2 |
| PITNEY BOWES GOVERNMENT SERVICES<br>20321 E. 35th DRIVE<br>AURORA CO 80011 | AURORA | 3 |
| PITNEY BOWES MANAGEMENT SOLUTIONS<br>9495 SW 72nd ST.<br>MIAMI FL 33173 | MIAMI | 4 |
| PITNEY BOWES INC.<br>55 HAWTHORNE ST.<br>SAN FRANCISCO CA 94105 | SAN FRANCISCO | 5 |

VIRTUAL CODE FOR DELIVERY TO THE NEAREST BUILDING OF ORGANIZATIONS HAVING MULTIPLE BUILDINGS

FIELD OF THE INVENTION

The invention relates generally to the field of mail delivery systems and more particularly to methods for delivering mail addressed to a recipient's nearest designated location to the place the mail was posted.

BACKGROUND OF THE INVENTION

Ever since the numeric codification of streets and buildings received general acceptance, an individuals' name and their household postal addresses have been linked. The sender of a letter or package would deliver a letter or package to the post with the correct recipient postal address, and the post would deliver the letter or package to the numeric street address of the recipient of the letter or package. A correct recipient postal address for the delivery of the letter or package to the recipient included: the name of the recipient; the street address of the recipient; the city and state of the recipient; and (more recently) the ZIP code of the recipient. Thus, the correct recipient postal address is usually the actual location of the recipient.

Typically, it takes the United States Postal Service (USPS) one to three days to deliver first class mail to a domestic recipient. If bill payments, certain business orders, and requests for business information are not received promptly by the business receiving the payments, soliciting the orders or having to provide the information, an increased amount of time will result before the money is received, and/or the order is fulfilled and/or the information is provided to the requestor. The foregoing may result in business losing interest income, having money float problems and/or losing possible business.

Many businesses have multiple geographic locations that receive their mail. If a California customer requests information from the New York office of the business or a New York bill payer sends their payment to the business California office the actual time it takes the business to receive the mail would be increased.

SUMMARY OF THE INVENTION

This invention overcomes the disadvantages of the prior art by providing a method that enables the post to deliver mail addressed to a nearest location virtual address to be delivered directly to the recipient's nearest designated location or facility to the place the mail was posted. Mail addressed to the nearest location virtual address (mapping to a street address or post office box) would be captured by the post during the post's sortation process and routed to the nearest location or facility to the place the mail was posted. This enables the recipient to receive their mail more quickly since the amount of delivery time is reduced.

An advantage of this invention is that the business that is using a nearest location virtual address may advertise that people send their correspondence to a single simple virtual address, which is far easier to remember than a number of distinct regional complete postal addresses.

Another advantage of this invention is that the use of a single corporate address eliminates the cost of creating, inventorying, managing, and distributing multiple versions of reply envelopes destined to each region of the country.

A further advantage of this invention is that it optimizes mail delivery time when the customer mails the return envelope from an unexpected location (e.g. a New York customer mails an envelope from vacation in California).

An advantage of this invention for the post is that it is compatible with the existing POSTNET barcode, ZIP code, and sort scheme processes.

Another advantage to the post is that corporate preaddressed envelopes contain redundant human readable and machine readable address information A still further advantage to the post is that this invention allows rerouting of mail if logistical issues, traffic, weather, corporate disasters, or mail volumes make the initial lookup address disfavored.

DETAILED DESCRIPTION OF THE PREFERRED EMBODIMENT

Figure 1:
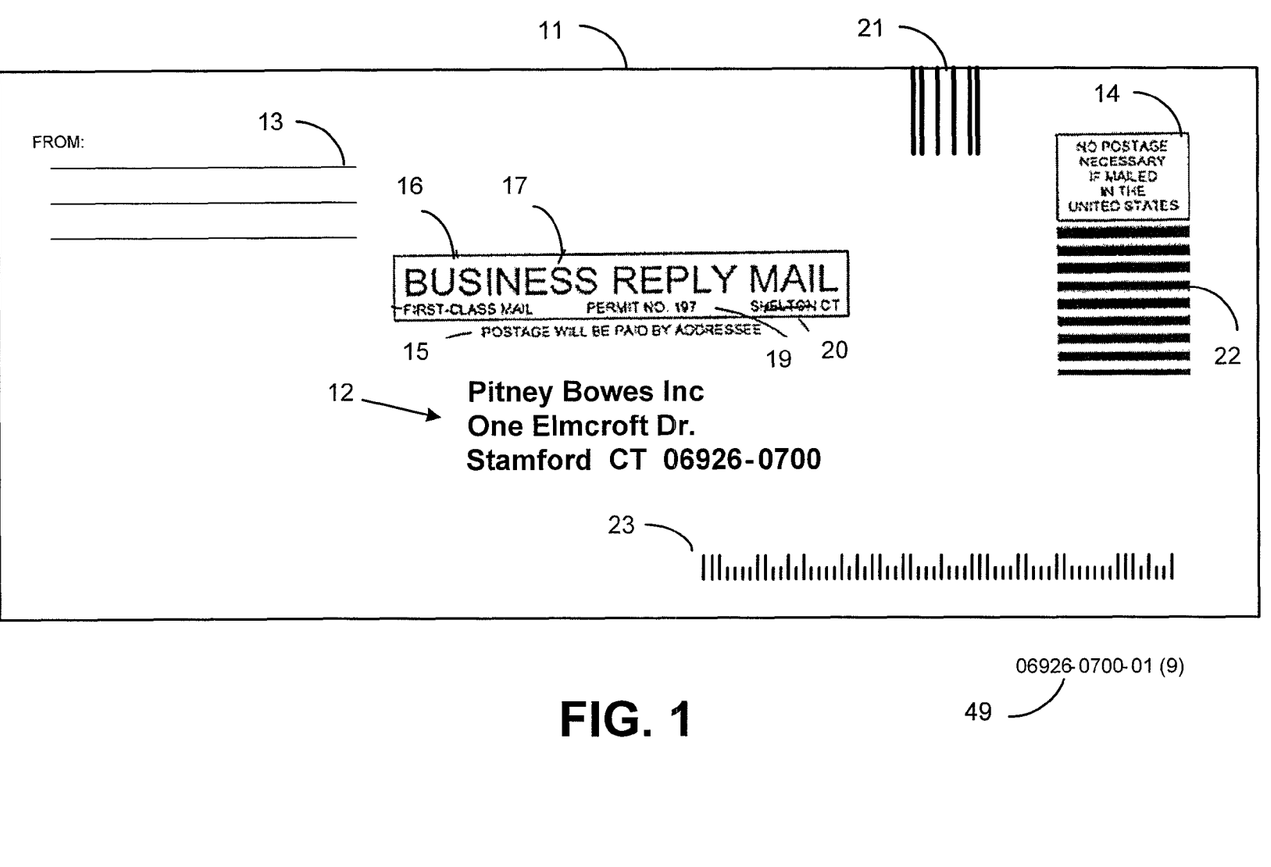
FIG. 1 is a drawing of a prior art business reply mail piece.

Referring now to the drawings in detail, and more particularly to Prior Art FIG. 1, the reference character 11 represents a business reply mail piece. Mail piece 11 has a recipient address field 12, and a sender address field 13, that is completed by the person returning business reply mail piece 11. A block 14 indicating that "No Postage Necessary If Mailed In "The United States" is positioned in the upper right hand corner of mail piece 11, and a statement 15 that indicates "Postage Will Be Paid By Addressee" is positioned above recipient address field 12. Mail piece 11 also contains a block 16 positioned above statement 15. Block 16 indicates the type of mail, i.e., business reply mail 17, the type of service, i.e., first class mail 18, the permit number 19 and the location 20 of the post office that issued permit number 19. A facing identification mark 21 is positioned along the top edge of mail piece 11, and business reply horizontal bars 22 are positioned along the right edge of mail piece 11. A POSTNET bar code 23 is positioned below recipient address field 12 in a bar code clear zone. Bar code 23 is numerically represented in space 49.

Figure 2:
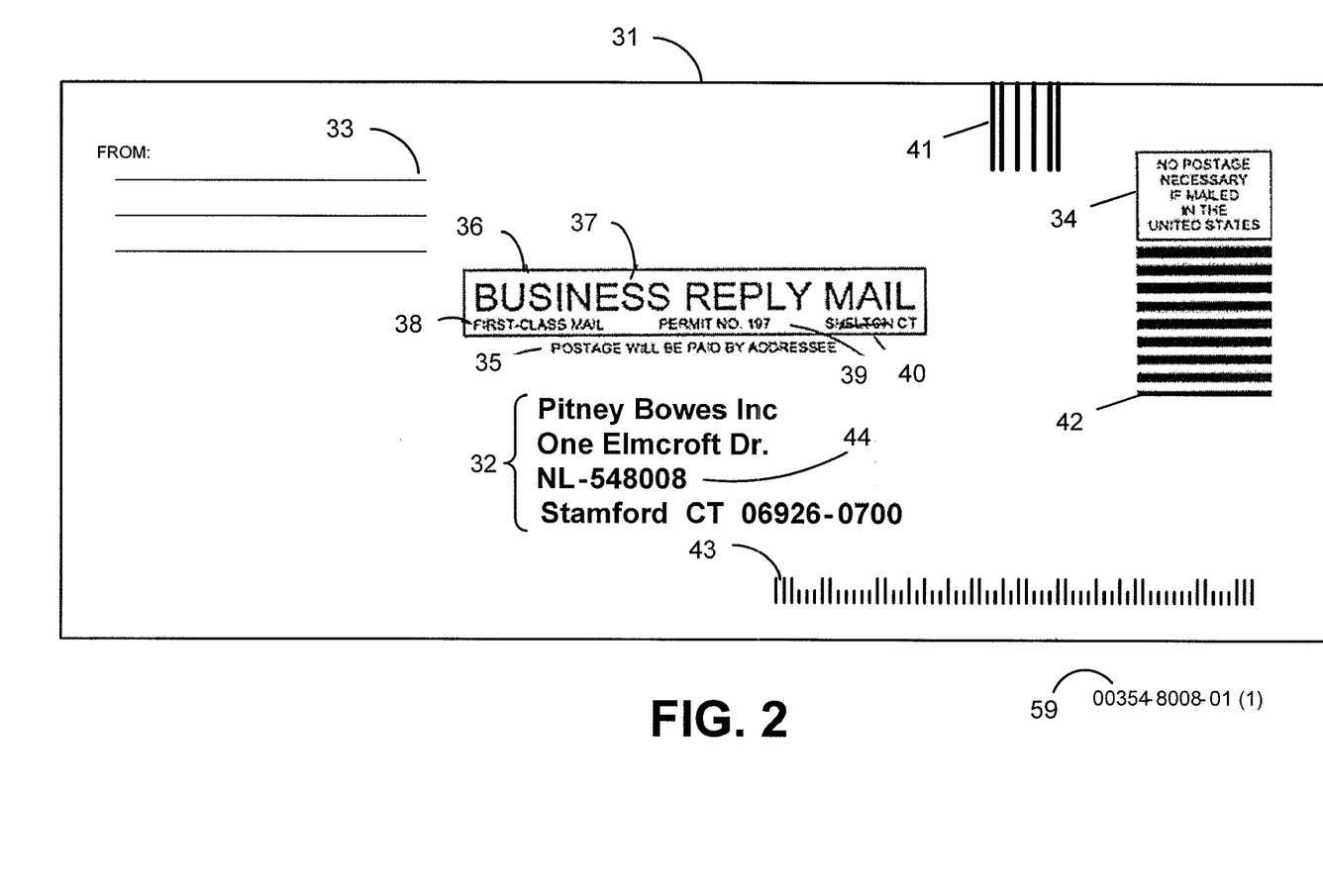
FIG. 2 is a drawing of a business reply mail piece that may be utilized by this invention.

FIG. 2 is a drawing of a business reply mail piece 31 that may be utilized by this invention. Mail piece 31 has a recipient address field 32, and a sender address field 33 that is completed by the person returning business reply mail piece 31. A block 34 indicating that "No Postage Necessary If Mailed In "The United States" is positioned in the upper right hand corner of mail piece 31, and a statement 35 that indicates "Postage Will Be Paid By Addressee" is positioned above recipient address field 32. Recipient address field 32 contains a mailing address and a designation 44 for nearest location virtual address number NL 548008. Virtual address NL 548008 does not physically exist, it is code that instructs the post office to deliver mail piece 31 to the recipient's nearest designated delivery point, i.e., location or facility. Mail piece 31 also contains a block 36 positioned above statement 35. Block 36 indicates the type of mail, i.e., business reply mail 37; the type of service, i.e., first class mail 38; the permit number 39; and, the location 40 of the post office that issued permit number 39. A facing identification mark 41 is positioned along the top edge of mail piece 31, and business reply horizontal bars 42 are positioned along the right edge of mail piece 31. A POSTNET bar code 43 is positioned below recipient address field 32. POSTNET bar code 43 may indicate that mail piece 31 is to be delivered in accordance with the instructions for nearest location virtual address number NL 548008. The "nearest location" format has triple redundancy for error recovery (even without a street address or city and state). The destination is uniquely determined by the: (1) registered company name, (2) the nearest location code, and (3) bar code 43. Bar code 43 is numerically represented in space 59.

Figure 3:
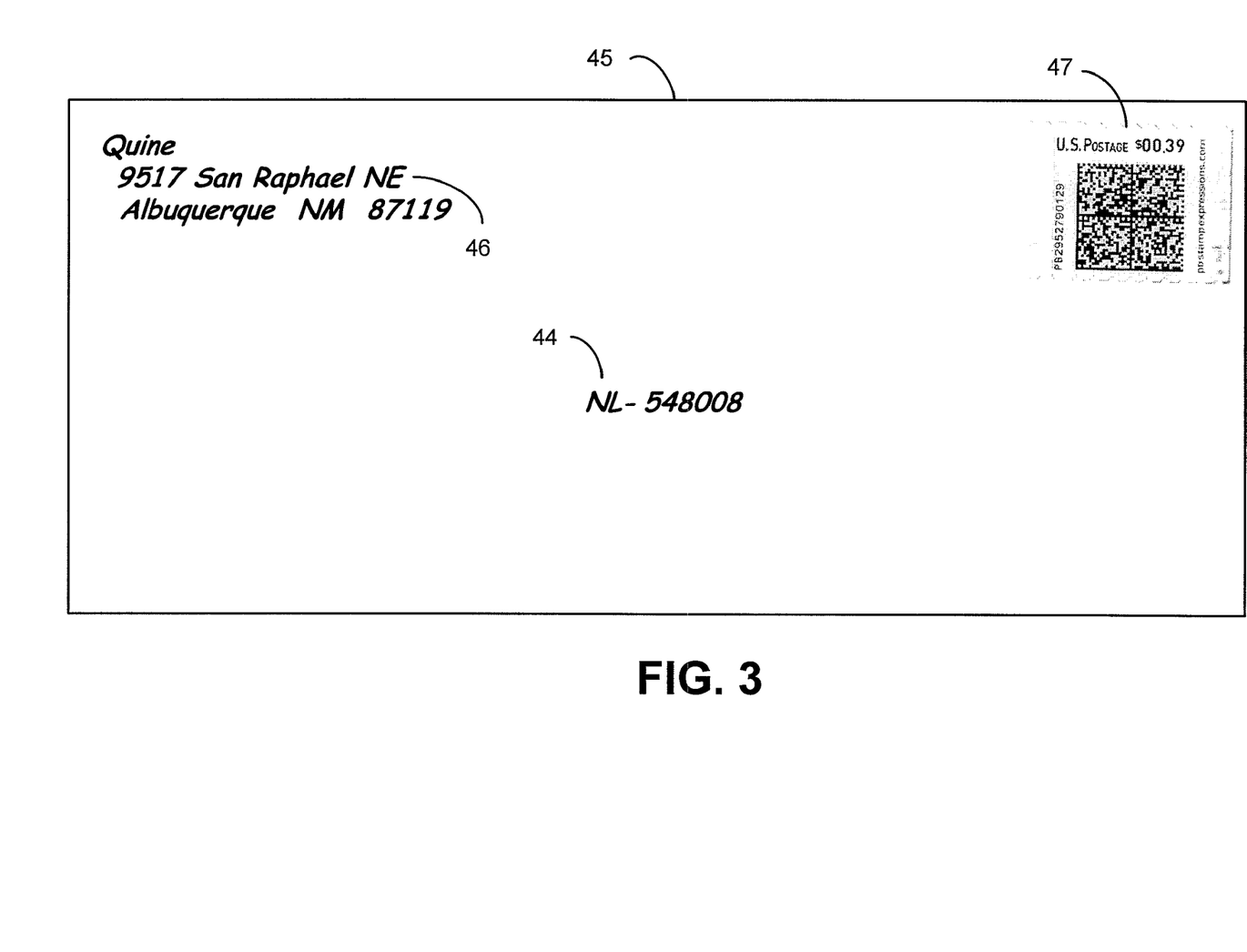
FIG. 3 is a drawing of an alternate version of a customer addressed mail piece that may be utilized by this invention.

FIG. 3 is a drawing of an alternate version of a mail piece that may be utilized by this invention. Mail piece 45 is addressed by the customer and has a recipient address field that only includes the nearest location virtual address designation 44 (i.e. nearest location virtual address NL 548008), a return address field 46 that is completed by the sender, and a postage stamp 47. Virtual address designation 44 may also be a company name, graphic design, logo, etc.

The customer might have been informed of the address (i.e., nearest location virtual address designation 44) through a mailed, television, radio, or internet advertisement. The customer manually addressed mail piece 45 and applied the postage.

Figure 4:
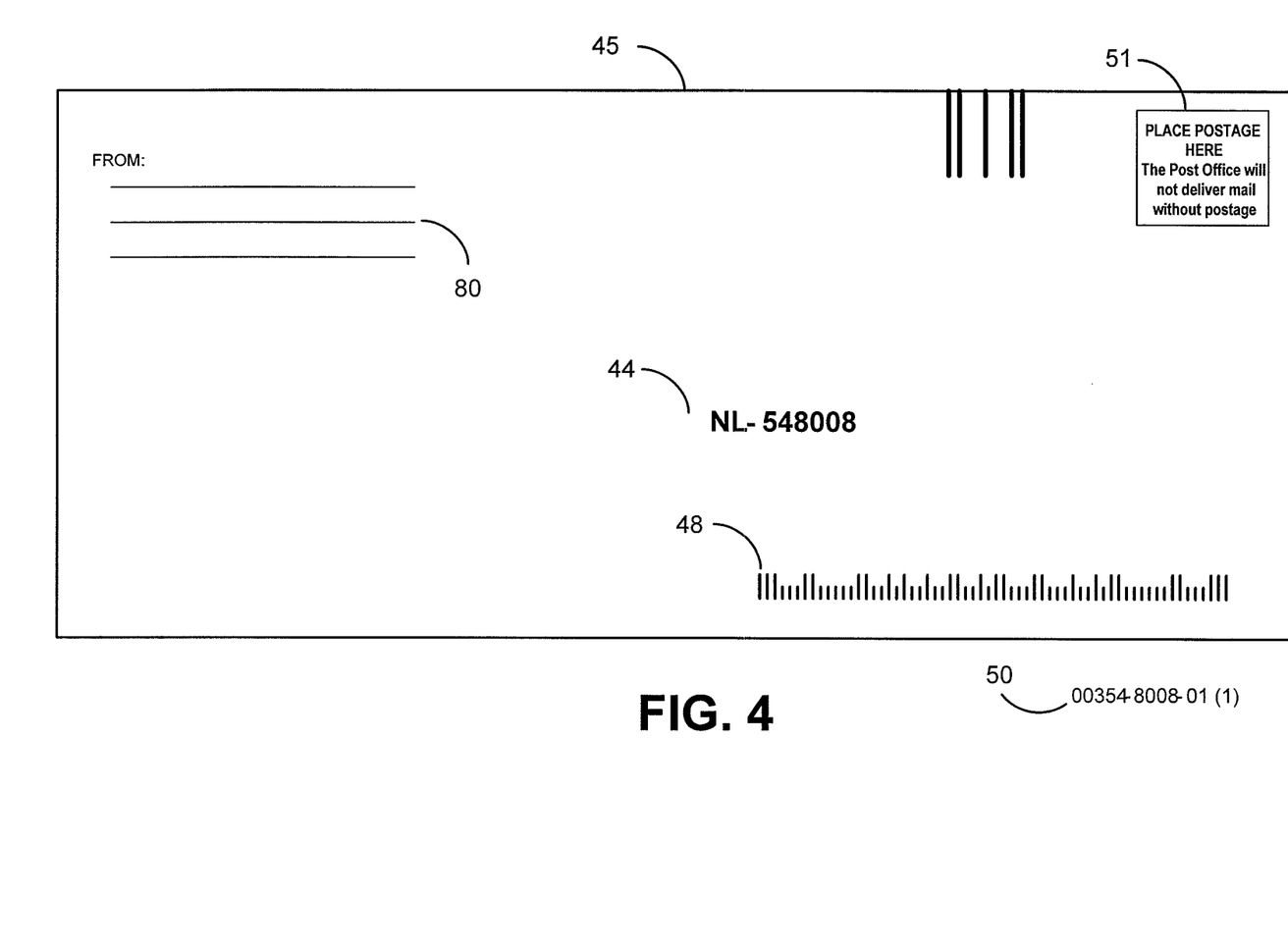
FIG. 4 is a drawing showing a courtesy reply envelope embodiment of the invention with a POSTNET bar code 48.

FIG. 4 is a drawing showing a preaddressed courtesy envelope provided by a business to a customer. It is a preprinted courtesy envelope with a nearest location virtual address 44, a POSTNET bar code 48, a return address block 80, and a space 51 where a postage stamp may be affixed. Bar code 48 represents a USPS automation compatible machine readable form (00354-8008-O1) of the human readable NL 548008 nearest location virtual address designation 44. In the structure of designation 44 and bar code 48, the "003" designates the nearest location service and 548008 is the code assigned to Pitney Bowes. The "nearest location" format has double redundancy for error recovery (even without a street address or city and state). The destination is uniquely determined by: (1) the nearest location code and (2) the bar code 48. Bar code 48 is numerically represented in space 50.

Figure 5:
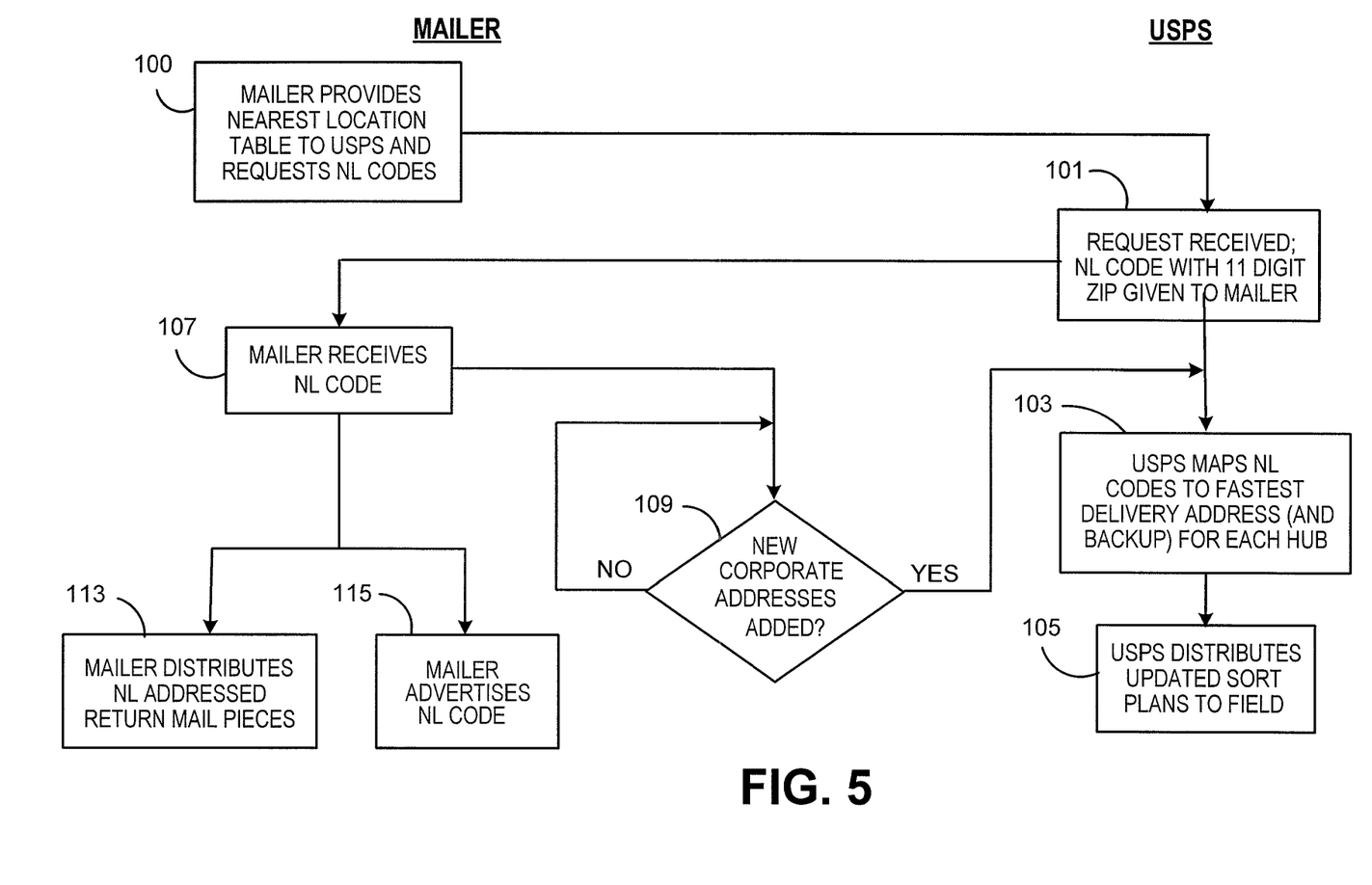
FIG. 5 is a drawing of a flow chart showing the registration/set up process for obtaining a virtual address.

FIG. 5 is a drawing of a flow chart showing the registration/set up process for obtaining a nearest location code. The process begins in step 100 where the mailer requests a nearest location code from the post and submits a list of alternative nearest locations to which the mailer would like their mail delivered by the post. Then in step 101 the post receives the mailers request (and list) and the post assigns a nearest location code with a POSTNET bar code to the mailer. Next in step 103 the post determines the nearest location (and the backup location) for each mail processing hub. This is based upon the fastest time to deliver a mail piece mailed at each mail hub. The operations performed by step 103 will be more fully described in the description of FIG. 8. Now in step 105 the post distributes the updated sorter sort plans created in step 103 to each of the mail processing hubs.

The mailer receives in step 107 their assigned nearest location code and POSTNET bar code from the post. Whenever the mailer wishes to add or delete a location from the list of nearest locations step 109 relays new newest location addresses to the post at step 103. If step 109 determines that a new location will not be added or deleted from the list, the list will not be updated at this time and the process rests at the input of step 109. After the mailer receives the nearest location code with a POSTNET bar code from the post, the mailer distributes business reply and courtesy reply envelopes containing the nearest location code in step 113 and advertises the nearest location code in step 115 to customers.

Figure 6:
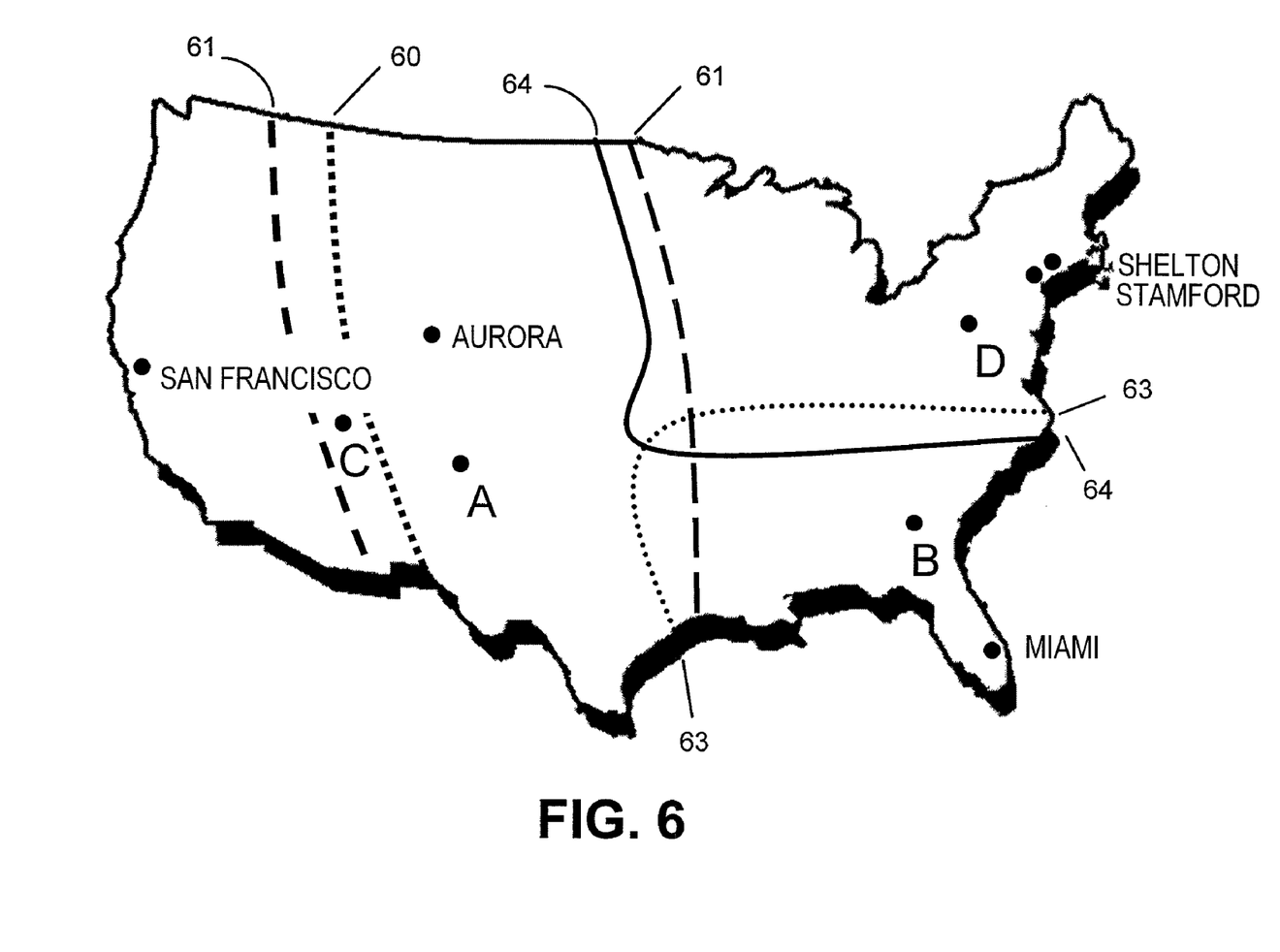
FIG. 6 is a drawing of a map of the continental United States showing cities in which a company has offices to which they may want their mail diverted.

FIG. 6 is a drawing of a map of the continental United States showing cities in which a company has offices to which they may want their mail delivered. The western borders of the United States and line 60 define the San Francisco region of the United States. The north and south borders of the United States and lines 61 define the Aurora region of the United States. Line 63 and the southeastern borders of the United States define the Miami region of the United States. The northeastern border of the United States and line 64 defines the Shelton-Stamford region of the United States. It will take approximately the same amount of time to deliver mail that is posted in one of the above regions and delivered to the above city or cities shown in that region.

If the mailpieces in FIGS. 2, 3, and/or 4 were mailed from Location A, the POSTNET barcode 43 (FIG. 2), 48 (FIG. 4), or designation 44 (FIG. 3) would identify to the local mail processing equipment that this was a mailpiece intended for delivery to the nearest location in the Aurora region. Pitney Bowes Government Solutions, at 20321 E. 35th Drive, Aurora Colo. 80011 is listed in FIG. 7 as the nearest location for the Aurora region, thus the mailpieces might be delivered there. If, on the other hand, the mailpieces were mailed from location B, the POSTNET barcode 43 (FIG. 2), 48 (FIG. 4), or designation 44 (FIG. 3) would identify to the local mail processing equipment that this was a mailpiece intended for delivery to the nearest location in the Miami region. Pitney Bowes Management Solutions, at 9495 SW 72nd Street, Miami Fla. 33173 is listed in FIG. 7 as the nearest location for the Miami region, thus the mailpieces might be delivered there. If the above mailpieces were mailed from location C the POSTNET barcode 43 (FIG. 2), 48 (FIG. 4), or designation 44 (FIG. 3) would identify to the local mail processing equipment that this was a mailpiece intended for delivery to the nearest location in the Aurora or San Francisco regions. When it would take approximately the same amount of time to deliver mailpieces to two different specified nearest location designations, the rankings in FIG. 7 would determine which address the mailpieces would be delivered to. In this case San Francisco has a ranking of "5" and Aurora has a rank of "2", thus the mailpieces would be delivered to Pitney Bowes Government Solutions, at 20321 E. 35th Drive, Aurora Colo. 80011. Finally if the above mailpieces were mailed from location D the POSTNET barcode 43 (FIG. 2), 48 (FIG. 4), or designation 44 (FIG. 3) would identify to the local mail processing equipment that this was a mailpiece intended for delivery to the nearest location in the Shelton-Stamford region.

Figure 7:
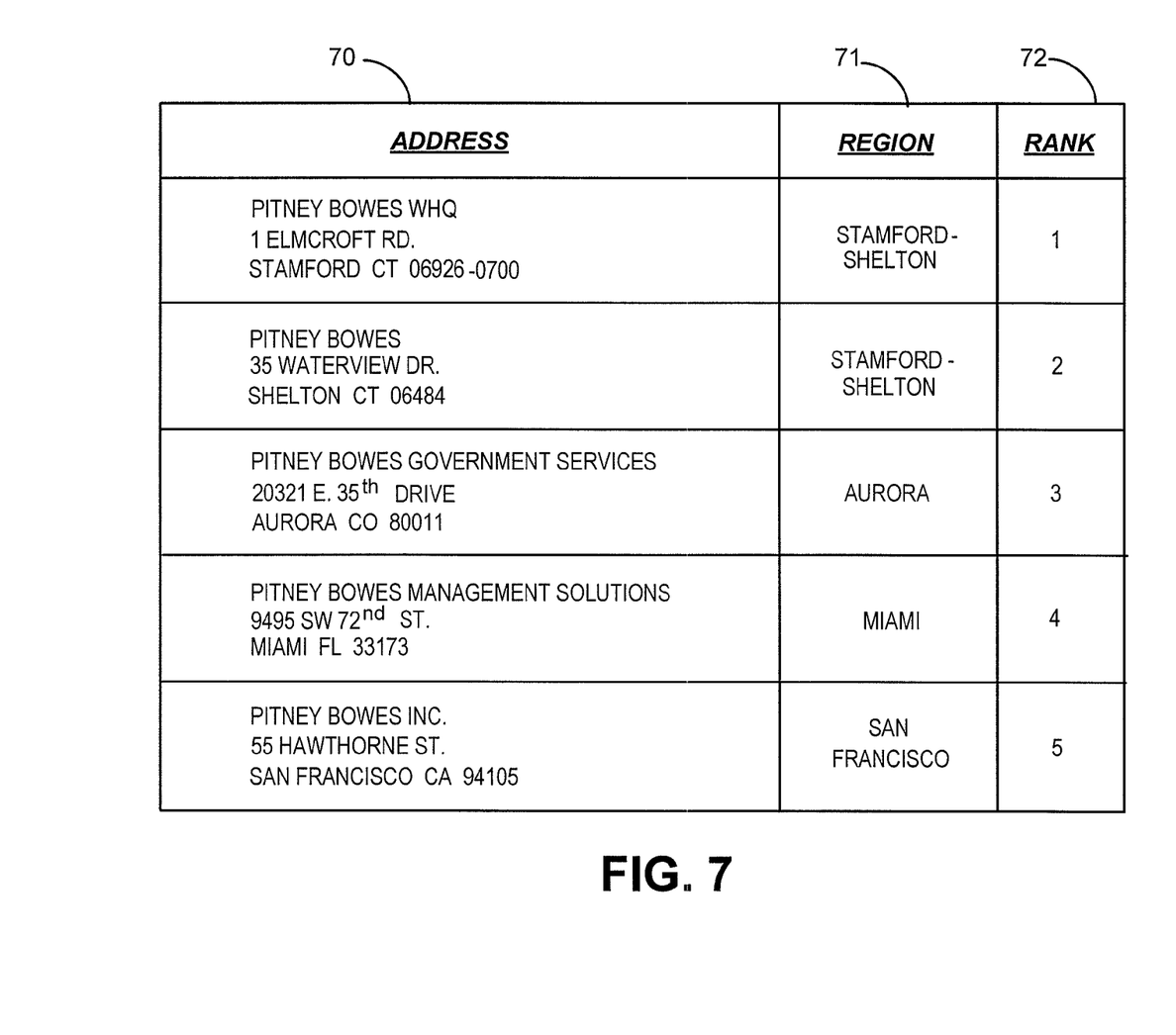
FIG. 7 is a business provided nearest location table.

When it would take approximately the same amount of time to deliver mailpieces to two different specified nearest location designations in a region, the rankings in FIG. 7 would determine which address the mailpieces would be delivered to. In this case Shelton has a ranking of "2" and Stamford has a rank of "1", thus the mailpieces would be delivered to Pitney Bowes WHQ, located at 1 Elmcroft Rd, Stamford Conn. 06926. In each instance, the mailpieces were delivered to a nearby location, reducing float time on any funds and ensuring rapid customer service. If weather or other operational issues prevent delivery to the primary address then the next best address for that region using the rankings of FIG. 7 would be used, i.e., if there is a problem delivering mail to Stamford, the mail would be delivered to Pitney Bowes at 35 Waterview Drive Shelton, Conn. 06484.

Figure 8:
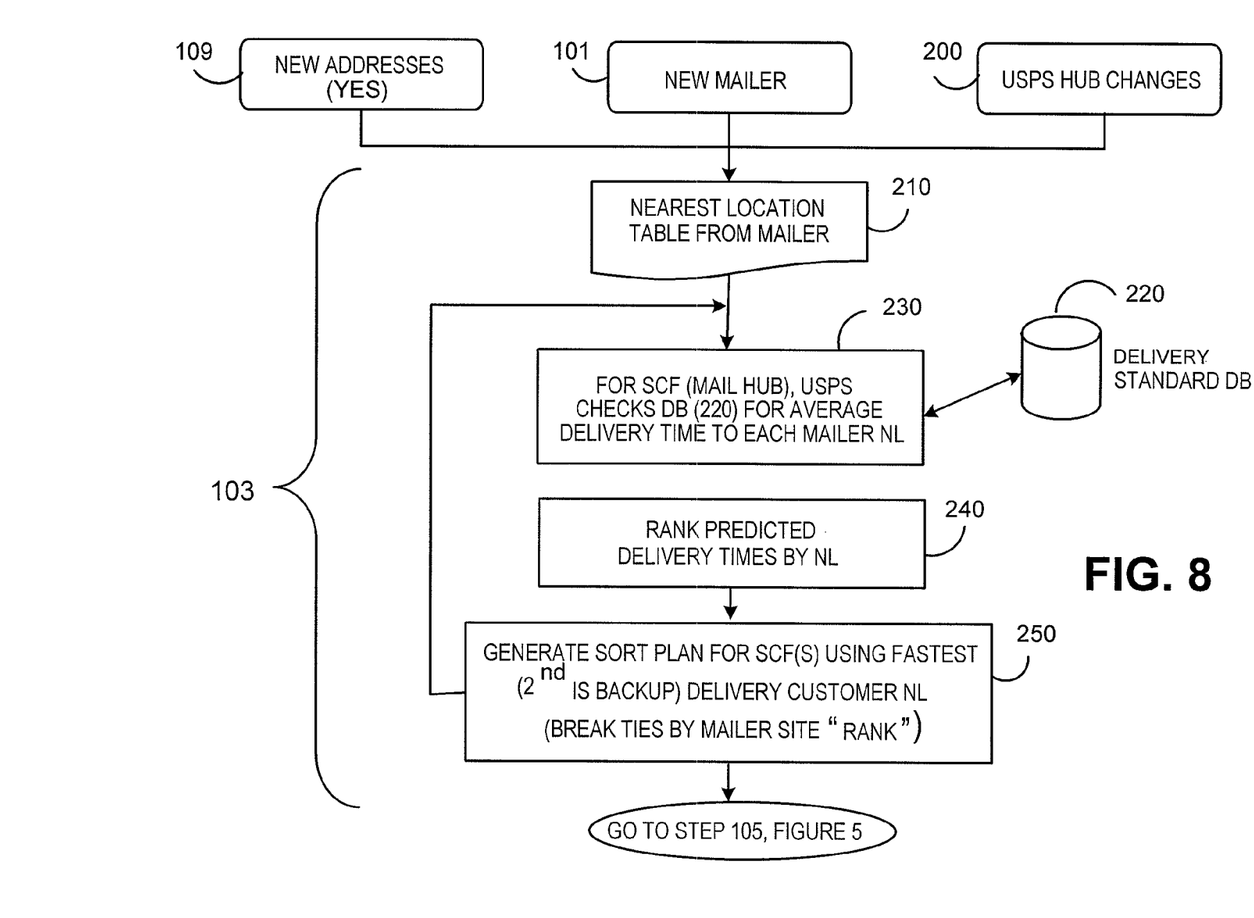
FIG. 8 is a drawing of a flow chart showing step 103 of FIG. 5 in greater detail.

FIG. 7 is a business provided nearest location table. Column 70 indicates the addresses of locations where the business would like mailpieces delivered. Column 71 indicates the region in which the addresses of column 70 are located. It is provided here for clarity of description; typically the post would obtain such data from delivery standard database 220 (FIG. 8). Column 72 indicates the business preference rankings for the addresses in column 70 where "1" represents the most preferred address and larger numbers represent lower ranking priorities.

FIG. 8 is a drawing of a flow chart showing step 103 of FIG. 5 in greater detail. If a new business mailer enrolls in the program (101), an existing mailer changes addresses (109), or the post changes their hub structure or routing times (200), the sort plans are regenerated. The sort plan regeneration process already occurs on a regular basis today. In step 210 the post utilizes the latest nearest location table from the mailer, i.e., the information contained in FIG. 7. Next in step 230 the post checks data base 220 for the average delivery time from each Sectional Center Facility (mail hub) to each mailer nearest location. The data base 220 reports, for instance, that mail deposited in ZIP codes beginning with the digits 068 is delivered the following business day in Shelton (06484) and Stamford (06926); it is delivered in 2 business days to Miami (33173); and it is delivered in 3 business days to Aurora (80011) and San Francisco (94105). Corresponding data is available for every other origination mail hub and destination ZIP code. Then in step 240 the post ranks each candidate nearest location by predicted delivery time. Next in step 250 the post generates a sort plan for each Sectional Center Facility using the fastest (and second fastest for the backup) nearest location. The business designated priority rankings are used to break ties (the information contained in FIG. 7). The process goes back to step 230 for the next mail hub. When all mail hubs are completed, the next step in the process will be step 105 (FIG. 5) in which the new sort plans are distributed by the post to the mail processing hubs. Typically these updated sort plans might be distributed weekly with the new business list incorporated and the latest postal processing flows and times incorporated in the routing plans.

The above specification describes a new and improved method for methods for delivering mail addressed to a nearest location virtual address to the recipients nearest location to the place the mail was posted. It is realized that the above description may indicate to those skilled in the art additional ways in which the principles of this invention may be used without departing from the spirit. Therefore, it is intended that this invention be limited only by the scope of the appended claims.

What is claimed is:

1. A method for delivering mail comprising the steps of:
   receiving a list of designated recipient delivery points;
   assigning a virtual address that is associated with all designated recipient delivery points on the list;
   associating each of the designated recipient delivery points on the list with a carrier facility;
   receiving, at the carrier facility, a mailpiece having the virtual address;
   using mail processing equipment at the carrier facility to obtain the virtual address from the mailpiece to ascertain the list of designated recipient delivery points; and
   delivering the mailpiece to one of the designated recipient delivery points.

2. The method claimed in claim 1, further including the step of:
   ranking the designated recipient delivery points on the list.

3. The method claimed in claim 2, further including the step of:
   utilizing the ranking to deliver the mailpiece to a lower ranking designated recipient delivery point when a higher ranking designated recipient delivery point is not available.

4. The method claimed in claim 2, further including the step of:
   utilizing the ranking to deliver the mailpiece to a lower ranking designated recipient delivery point when a higher ranking designated recipient delivery point is not a preferred delivery point.

5. The method claimed in claim 2, further including the step of:
   utilizing the ranking to deliver the mailpiece to a higher ranking delivery point.

6. The method claimed in claim 1, wherein the virtual address comprises one or more alphanumeric characters.

7. The method claimed in claim 1, wherein the virtual address is a company name.

8. The method claimed in claim 1, wherein the virtual address is a graphic.

9. The method claimed in claim 1, wherein the virtual address is a bar code.

10. The method claimed in claim 1, further including the step of:
    placing alphanumeric and bar code representations on the mailpiece each being representative of the virtual address.

11. The method claimed in claim 1, wherein the mailpiece is a business reply envelope.

12. The method claimed in claim 1, wherein the mailpiece is an envelope.

13. The method claimed in claim 1, wherein the mailpiece is delivered to the designated recipient delivery point on the list closest to a location where the mailpiece was posted.

14. The method claimed in claim 1, wherein the carrier facility is a mail processing facility.

15. The method claimed in claim 1, wherein the carrier facility is closest to the one of the designated recipient delivery points.

16. The method claimed in claim 1, wherein the one of the designated delivery points is the designated recipient delivery point to which the mailpiece can be delivered from the carrier facility in the shortest time.

* * * * *